US00RE44935E

(19) United States
(12) Reissued Patent
Provencher et al.

(10) Patent Number: US RE44,935 E
(45) Date of Reissued Patent: Jun. 10, 2014

(54) SUBMERSIBLE ROBOT FOR OPERATING A TOOL RELATIVE TO A SURFACE OF AN UNDERWATER STRUCTURE

(71) Applicant: Hydro-Quebec, Montreal (CA)

(72) Inventors: Luc Provencher, Contrecoeur (CA); Stephan Gendron, Saint-Bruno-de-Montarville (CA); Rene Morin, Varennes (CA); Michel Blain, Saint-Amable (CA)

(73) Assignee: Hydro-Quebec, Montreal, Quebec (CA)

(21) Appl. No.: 13/998,011

(22) Filed: Sep. 23, 2013

Related U.S. Patent Documents

Reissue of:
(64) Patent No.: 8,459,196
Issued: Jun. 11, 2013
Appl. No.: 13/249,404
Filed: Sep. 30, 2011

(30) Foreign Application Priority Data

Oct. 1, 2010 (CA) ..... 2716451

(51) Int. Cl.
*B63B 59/00* (2006.01)

(52) U.S. Cl.
USPC ..... 114/222; 414/589; 901/2; 901/46

(58) Field of Classification Search
USPC ..... 114/222; 901/2, 47; 414/589
See application file for complete search history.

(56) References Cited

U.S. PATENT DOCUMENTS

| | | | | |
|---|---|---|---|---|
| 4,444,146 | A * | 4/1984 | De Witz et al. | 114/222 |
| 4,462,328 | A * | 7/1984 | Oram | 114/222 |
| 4,502,407 | A * | 3/1985 | Stevens | 114/222 |
| 4,821,665 | A * | 4/1989 | Matthias et al. | 114/222 |
| 5,047,990 | A * | 9/1991 | Gafos et al. | 367/6 |
| 5,377,238 | A * | 12/1994 | Gebelin et al. | 376/260 |
| 5,398,632 | A * | 3/1995 | Goldbach et al. | 114/222 |
| 5,513,930 | A * | 5/1996 | Eathorne | 114/222 |
| 5,852,984 | A * | 12/1998 | Matsuyama et al. | 114/222 |
| 6,309,147 | B1 * | 10/2001 | Matsumoto et al. | 408/67 |
| 6,555,779 | B1 * | 4/2003 | Obana et al. | 219/121.63 |
| 8,459,196 | B2 * | 6/2013 | Provencher et al. | 114/222 |
| 2002/0121291 | A1 * | 9/2002 | Daum et al. | 134/8 |
| 2010/0062697 | A1 * | 3/2010 | Vedsted et al. | 452/2 |

FOREIGN PATENT DOCUMENTS

| | | | |
|---|---|---|---|
| JP | 2005-297090 | * | 10/2005 |
| JP | 2005-297090 | A | 10/2005 |

* cited by examiner

*Primary Examiner* — Stephen Avila
(74) *Attorney, Agent, or Firm* — Muirhead and Saturnelli, LLC

(57) ABSTRACT

A submersible robot for operating a tool relative to a surface of an underwater structure has a tool holder movably mounted on a support assembly provided with a driving arrangement for movably holding the tool in operative position relative to the surface. Position and orientation of the support assembly relative to the surface is locked and adjusted by locking and leveling arrangements. A programmable control unit operates the driving, locking and leveling arrangements and the tool and receives measurements from a sensor unit. The control unit has an operation mode wherein a positioning of the robot is determined and controlled as function of an initial position for defining a first work area, and shifted positions of the robot for defining additional work areas, the work areas having overlapping portions with one another for tracking displacements of the robot relative to the surface of the structure using the sensor unit.

19 Claims, 8 Drawing Sheets

SUBMERSIBLE ROBOT FOR OPERATING A TOOL RELATIVE TO A SURFACE OF AN UNDERWATER STRUCTURE

Matter enclosed in heavy brackets [ ] appears in the original patent but forms no part of this reissue specification; matter printed in italics indicates the additions made by reissue.

FIELD OF THE INVENTION

The present invention generally relates to works relative to an underwater structure, and more particularly to a submersible robot for operating a tool relative to a surface of an underwater structure. The targeted structure may be one of the embedded parts present on hydroelectric works, in particular a runway, seal seat, sill or lintel of a sluice.

BACKGROUND

The runways, the seal seats, the sill or the lintel of a sluice, in a hydroelectric work, are used to receive a gate or stop logs in order to block and seal the opening in a dam. Its structures are prone to wear as time passes and thus requiring restoration works in order to preserve their functionalities. The traditional underwater structure restoration methods are based on minor repair tasks that may be completed under water by experimented divers and also on major works that require the preliminary installation of a cofferdam in order to dry the work area.

The automated underwater restoration exhibits economical advantages, but raises serious technical problems due to the design of the submersible systems comprising various electromechanical parts. Other problems arise to both ensure automated and remotely operated tasks in an underwater environment, where the human presence is considered dangerous, where the visibility is reduced and the availability of the required sensors is limited. The underwater enviromnent is also a source of important perturbations that may affect the operation of the sensors, the manipulators and other actuators. The control of the machining process is also affected by the underwater environment and poses precision and repetitiveness problems. Furthermore, it is necessary for certain works to perform the restoration in different time windows having variable durations. To optimize the restoration time and allow respecting these time windows, the installation and uninstallation time in the work area must be as short as possible, which implies that it is important to reduce the amount and volume of the equipment to be installed to its minimum, as well as to simplify the complexity of the installation and the number of steps to be followed.

Some apparatuses allowing performing works under water have already been proposed.

For example, U.S. Pat. No. 6,309,147 (Matsumoto et al.) shows a remotely operated tool for drilling a plate in a nuclear reactor vessel. The tool has a drill bit moving along its rotation axis inside a stationary sleeve. The tool is mounted over the plate to be drilled, and a system is provided for collecting the chips resulting from the drilling. The drilling requires that the tool be still and properly fixed with respect to the plate to be drilled, and thus has no lateral or transverse mobility for its displacement, nor vertical other than that relative to the drill bit as required for the drilling. Furthermore, the tool is only provided with a basic controller limited to the operation of the motors of the tool and not designed to have automation capabilities for the drilling task, and even less for other tasks.

U.S. Pat. No. 6,555,779 (Obana et al.) proposes an apparatus that prevents water from entering in a bell covering and sliding on a workpiece, for example for welding or cutting. The apparatus has a pressurized water or gas injection system intended to form a water or gas curtain around the periphery of the bell to prevent water from entering. The apparatus is especially designed for performing a welding task along a line and can be mounted on a track by means of an assembly subjected to no important stresses and having a consequent construction. The control of the welding task is achieved by remote control operations from a worker, or by an automated mechanism reacting to image data captured with a camera during the welding.

U.S. Pat. No. 5,377,238 (Gebelin et al.) proposes a device for cutting or grinding a support of a nuclear reactor fuel assembly. The configuration of the device is specifically adapted to the prismatic geometry of the fuel assembly, and thus has a platform horizontally fastening to a support of the fuel assembly, a mobile carriage mounted on the platform, a hoist for hoisting the assembly, clamping elements for immobilizing the assembly, a table mounted on the carriage with a return element, a tool support mounted on the table, and a tool secured to the tool support.

JP application 2005297090 (Sato et al.) proposes a device for underwater polishing of a workpiece and collecting chips without however requiring a suction pump. The device comprises impellers disposed on the rotation shaft of the tool located in a bell so as to produce a negative pressure in the bell for draining the chips and water towards a filter that collects the chips. The construction of the device only allows light polishing or grinding works In general, the prior art apparatuses and devices have automation, mobility, portability, installation, robustness, stiffness, precision and/or adaptation capabilities limited to such an extent that they are not adapted to the automation and achievement of intensive machining or measurement works under water, as for the milling of embedded parts of hydroelectric structures. This case of milling involves important stresses and vibrations at the level of the manipulator of the milling tool and requires a good global stiffness.

SUMMARY

An object of the invention is to provide a submersible robot for operating a tool relative to a surface of an underwater structure, like one of the embedded parts present on hydroelectric works, in particular runways, seal seats, the sill or the lintel of a sluice used to receive gates and stop logs.

Another object of the invention is to provide such a robot that is apt to achieve machining tasks and in particular surfacing, face milling, plunge milling, slotting, ramping, contour milling, 3D machining, drilling, boring, spot facing or tapping of parts of various sizes.

Another object of the invention is to provide such a robot that can operate by using a combination of relative reference in relation to the structure to be machined, without using an added referencing support structure.

Another object of the invention is to provide such a robot that may measure the surface with precision, before and after a machining task.

Another object of the invention is to provide such a robot that has short installation and uninstallation times compared to the prior art apparatuses.

Another object of the invention is to provide such a robot that can stand still in relation to the structure to be machined, without using an added support structure.

According to one aspect of the present invention, there is provided a submersible robot for operating a tool relative to a surface of an underwater structure, comprising:

a support assembly;

a tool holder for holding the tool in operative position relative to the surface of the structure, the tool holder being movably mounted on the support assembly so that the tool is movable in a work area relative to the surface of the underwater structure when the tool is mounted on the tool holder;

a driving arrangement mounted on the support assembly for moving the tool holder so that the tool is movable within the work area when the tool is mounted on the tool holder;

a locking arrangement mounted on the support assembly for locking a position of the support assembly relative to the surface of the underwater structure;

a levelling arrangement mounted on the support assembly for adjusting an orientation of the support assembly relative to the surface of the underwater structure when the support assembly is locked by the locking arrangement;

a sensor unit directable toward the surface of the underwater structure, for measuring a distance between the robot and the surface of the underwater structure; and a programmable control unit mounted on the support assembly for operating the driving arrangement, the locking arrangement, the levelling arrangement and the tool and receiving measurements from the sensor unit, the programmable control unit having an operation mode wherein a positioning of the robot relative to the surface of the structure is determined and controlled as function of an initial position of the robot for defining a first work area, and shifted positions of the robot for defining additional work areas, the work areas having overlapping portions with one another for tracking displacements of the robot relative to the surface of the underwater structure using the sensor unit.

Preferably, the robot is connected to a control station above water surface via an umbilical cable. The control station may comprise power supplies, monitors and a computer that produces and transmits control signals to the robot and provides a user interface.

An electromagnetic clutch may be used for coupling the tool holder to a motor mounted on the support assembly for driving the tool. The robot may be provided with a suction nozzle located close to the tool and coupled to a flexible pipe connected to a submersible pump, allowing the suction of dust and chips produced by the tool and possibly their recovery and filtration at the pump outlet.

The robot may be provided with a submersible camera possibly reduced in size, positioned to view the tool.

The support assembly may be made of frame members advantageously usable to perform large machining works.

The locking and levelling arrangements may have a configuration allowing the holding, the locking and the positioning of the robot in a slot facing the section of the surface to be worked or inspected.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

As used in connection with this disclosure, the term "underwater structure" comprises a structure that may be fully or partially immerged or submerged.

Figure 1:
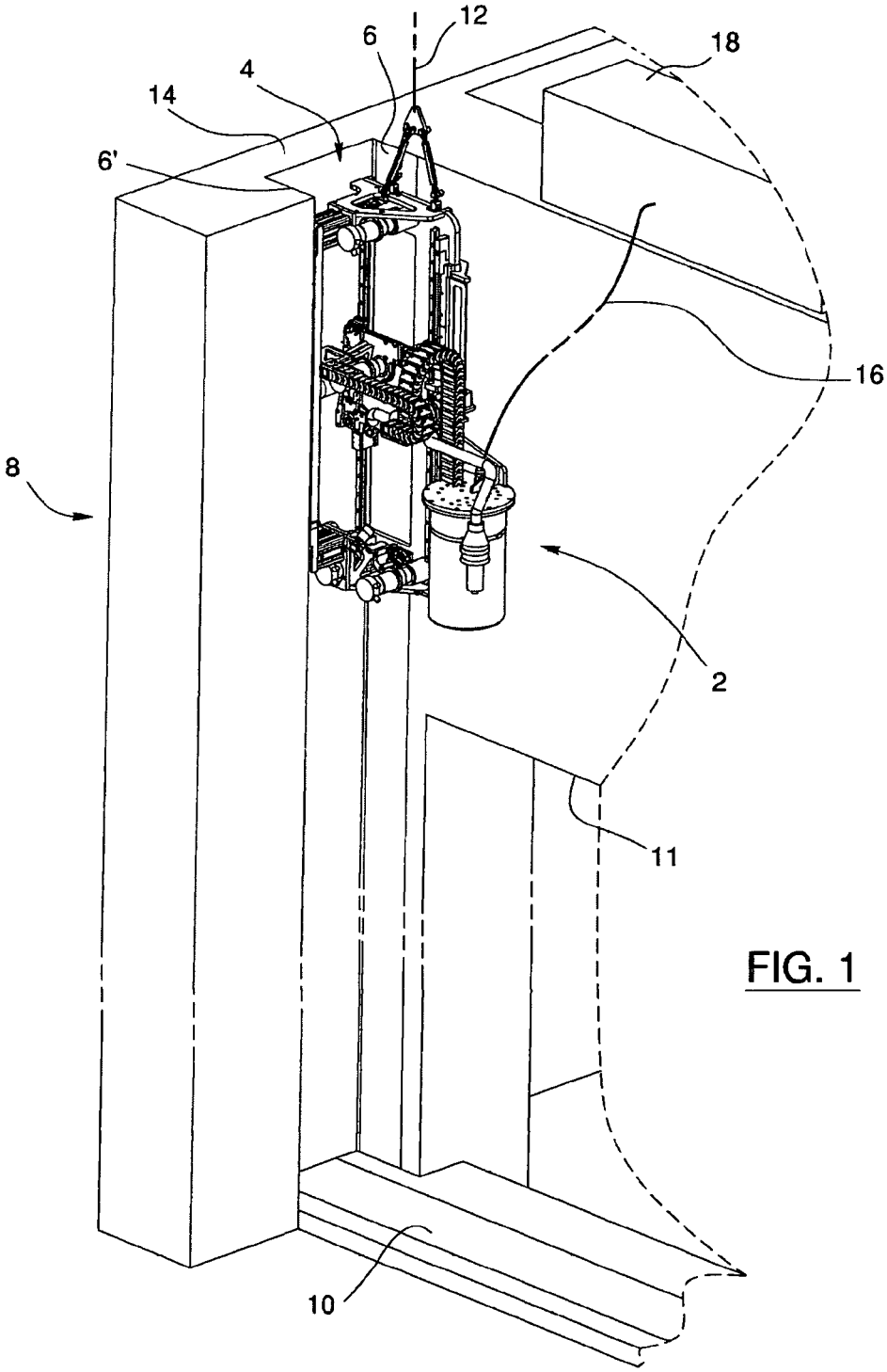
FIG. 1 is a schematic diagram of a submersible robot according to the invention, in position inside a dam gate slot, for achieving a milling task for the restoration of a seal seat.

Referring to FIG. 1, there is shown a submersible robot 2 according to the invention, in position inside a dam gate slot 4, for achieving a milling task for the restoration of a runway 6 (or seal seat) of an underwater dam structure 8. The following description of the robot 2 is made with reference to such a task. It should however be understood that the robot 2 is not limited to such a task and may be used for milling a sill 10 or lintel 11 of a sluice or other embedded parts of a hydroelectric work, or for performing other tasks, on other kinds of underwater structures. In FIG. 1, the robot 2 is positioned for milling the surface of the runway 6. It can be inverted for milling the surface of the part 6' opposite to the runway 6.

Installation of the robot 2 can be achieved by placing it above the slot 4 and subsequently lowering it inside the slot 4 by means of a cable 12 using a hoisting system like a winch, a bridge crane, etc. (not shown) in order to roughly position the robot 2 at the desired vertical distance from the upper surface 14 of the slot 4. The robot 2 is then lowerable along the runway 6 down to the lowermost point formed by the sill 10. The electrical supply and the control of the robot 2 may be achieved through an umbilical cable 16 from a control station 18 located above water level. The umbilical cable 16 may combine power and communication conductors (not shown) and a gas supply pipe (not shown). The conductors and the pipe may be separated from one another if desired.

Figure 2:
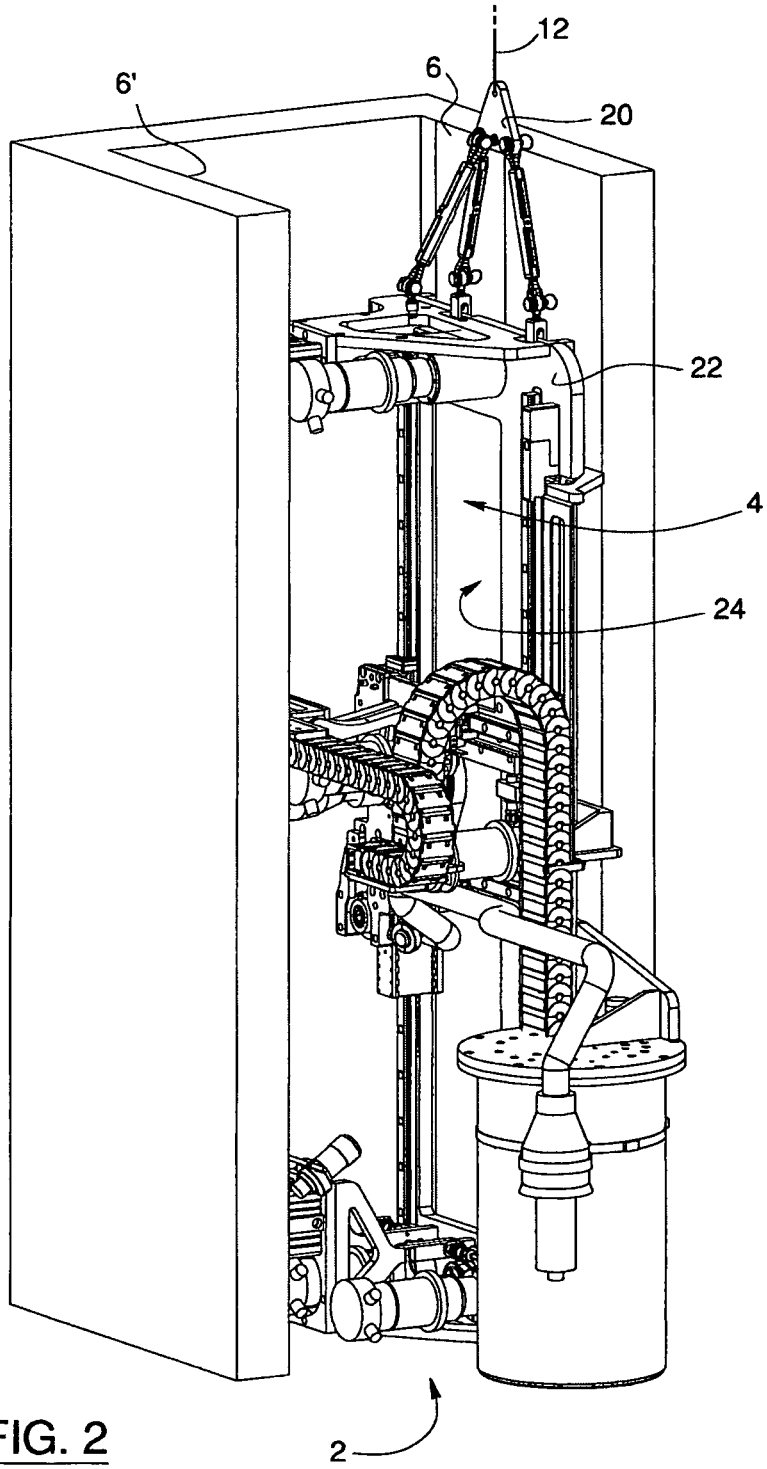
FIG. 2 is a schematic close-up diagram of the robot positioned in the slot shown in FIG. 1.

Referring to FIG. 2, the robot 2 can be fastened to the cable 12 by means of a fastening arrangement 20. The robot 2 has a support assembly 22 having an opening 24 through which the surface of the runway 6 can be machined.

Figure 3:
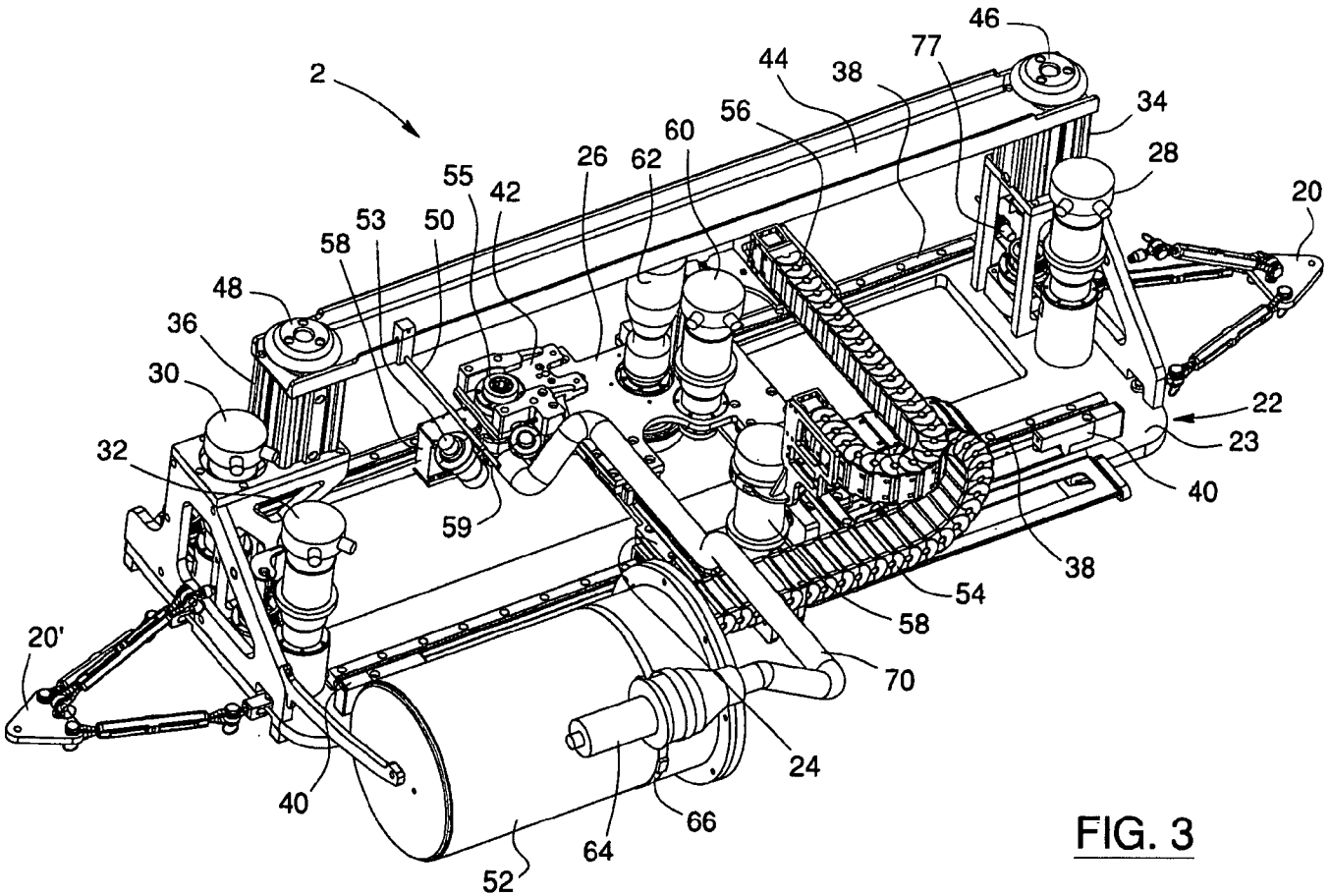
FIG. 3 is a schematic diagram of the submersible robot according to the invention.

Referring to FIG. 3, the support assembly 22 has an elongated frame 23 and two mobile members 24, 26 moveably mounted on respective guiding members such as pairs of tracks 38 (only the tracks 38 for the mobile member 24 can be seen in the Figure) that respectively define Y and X axes along which the mobile members 24, 26 can be moved, in order to position a tool holder 42 with respect to the surface to be machined. The tracks 38 can be provided with stops 40 at opposite ends. Displacement of the mobile members 24, 26 can be achieved using corresponding driving mechanisms, for example rack and pinion systems (detailed hereinafter) in parallel with the pairs of tracks 38, coupled to motors 58, 60.

The support assembly also has levelling legs 28, 30, 32 and 60 two thrust pistons 34, 36 (or jacks) for locking the support assembly 22 in operative position with respect to the surface to be machined. The pistons 34, 36 are preferably linked with each other by a transverse member 44 for rigidity purposes. The pistons 34, 36 can be operated using the gas supply in the umbilical cable 10 (shown in FIG. 1). With appropriate gas pressure, both pistons 34, 36 extend so that their feet 46, 48 press against the surface 6' opposite to the surface 6 to be machined. As a result, the pistons 34, 36 cause a counteraction on the levelling legs 28, 30, 32, so that the robot 2 is held in position by friction inside the slot 4 (shown in FIG. 2) with five pressure points. A camera support 50 can be secured to the transverse member 44 in order to support and direct a camera 53 for viewing the displacement of the mobile members 24, 26.

Figure 7:
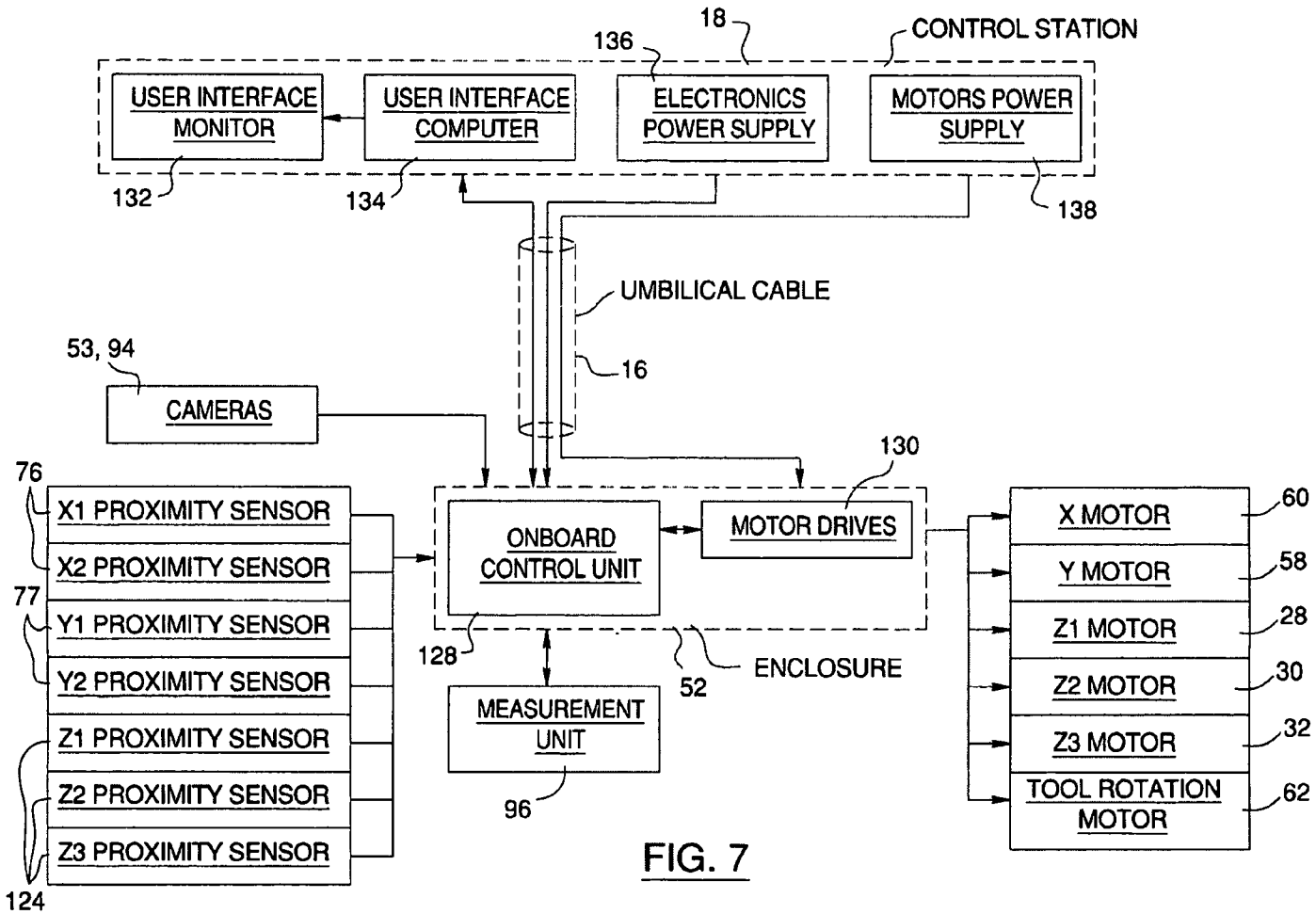
FIG. 7 is a schematic control diagram of the robot according to the invention.

The robot 2 has a watertight enclosure 52 containing electric and electronic components forming an onboard control unit 128 (shown in FIG. 7). The enclosure 52 is connectable to the umbilical cable 16 (shown in FIG. 1) and to other sensor and actuator cables (not shown) of the robot 2. The cables going toward the mobile members 24, 26 preferably pass through flexible cable guides 54, 56 that protect the cables and allow fluid movement of the mobile members 24, 26. The onboard control unit 128 is programmable and allows operating the motors 58, 60 and possibly a motor 62 for operating the tool 92 (shown e.g. in FIG. 4). The control unit 128 may be configured to perform the machining task according to an open loop control mode, with trajectory monitoring. A closed loop control mode may also be used if desired.

The robot 2 may be provided with a pump 64 preferably extending outside the slot 4 (shown in FIG. 2) and attached to the enclosure 52 for example by a tightening clamp 66. The pump 64 is connectable to a suction nozzle 68 (shown in FIG. 5B) on the tool holder 42 through a flexible hose or pipe 70. for suction of the dust and chips produced during the milling task. The chips can be filtered and/or collected at the outlet of the pump 64 or discharged at the surface for subsequent processing.

The robot 2 may be fastened to the cable 12 (shown in FIG. 1) using one of the fastening arrangements 20, 20' provided at the opposite ends of the support assembly 22, depending on the surface 6, 6' of the slot 4 (shown in FIG. 2) to be machined. In the illustrated case of FIG. 2, the fastening arrangement 20 is used for milling the surface 6. The fastening arrangement 20' would then be used for milling the surface 6'.

The robot 2 preferably has a modular configuration so that it can be adapted to different sizes of slots by modifying the arrangement, positions and sizes of its mechanical parts, and the arrangement and positions of its sensors and actuators.

Figure 4:
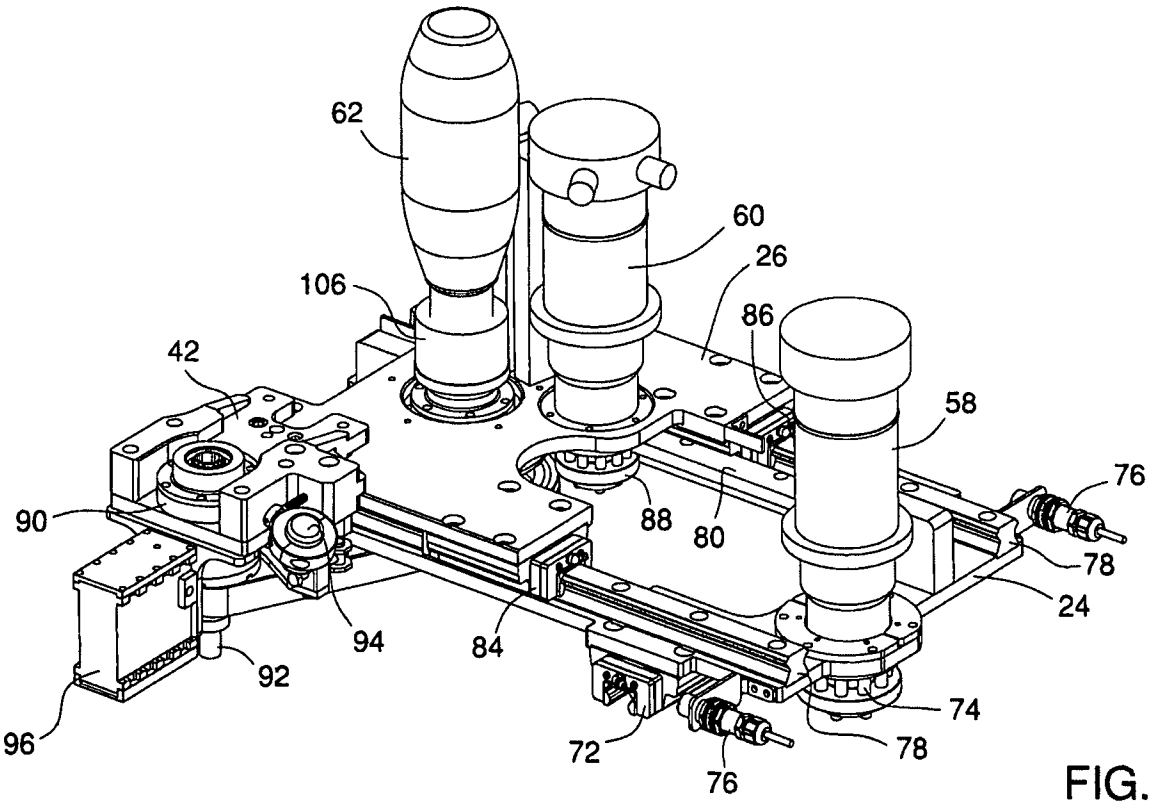
FIG. 4 is a schematic diagram of two frame members of a support assembly for a milling tool, a laser measurement sensor, a suction nozzle and a mini-camera according to the invention, allowing displacements in a plane perpendicular to the milling tool.

Referring to FIG. 4, the mobile member 24 has two pairs of guiding shoes 72 (only one shoe 72 of a pair is apparent in the Figure, the other shoe of the same pair being hidden behind the motor 58 whereas the shoes of the other pair are respectively hidden by the tool holder 42 and the mobile member 26) slideably mounted on the tracks 38 (shown in FIG. 3). The rack and pinion system used to move the mobile member 24 in the Y axis may be formed of a precision pinion 74 coupled to the motor 58 and engaging with a rack (not shown) extending on the support assembly 22 (shown in FIG. 3) in the Y direction. The motor 58 may be a hybrid stepping motor with an integrated reducer. Induction or other types of proximity sensors 76 may be mounted near ends of the guiding shoes 72 to detect the stops 40 (shown in FIG. 3) for limiting the displacement of the mobile member 24.

Tracks 78 can be mounted on the member 24 for guiding the member 26 in the X axis in order to position the tool holder 42 with respect to the surface to be machined. A rack 80 in parallel with one of the tracks 78 can be used to move the member 26.

Figure 5A:
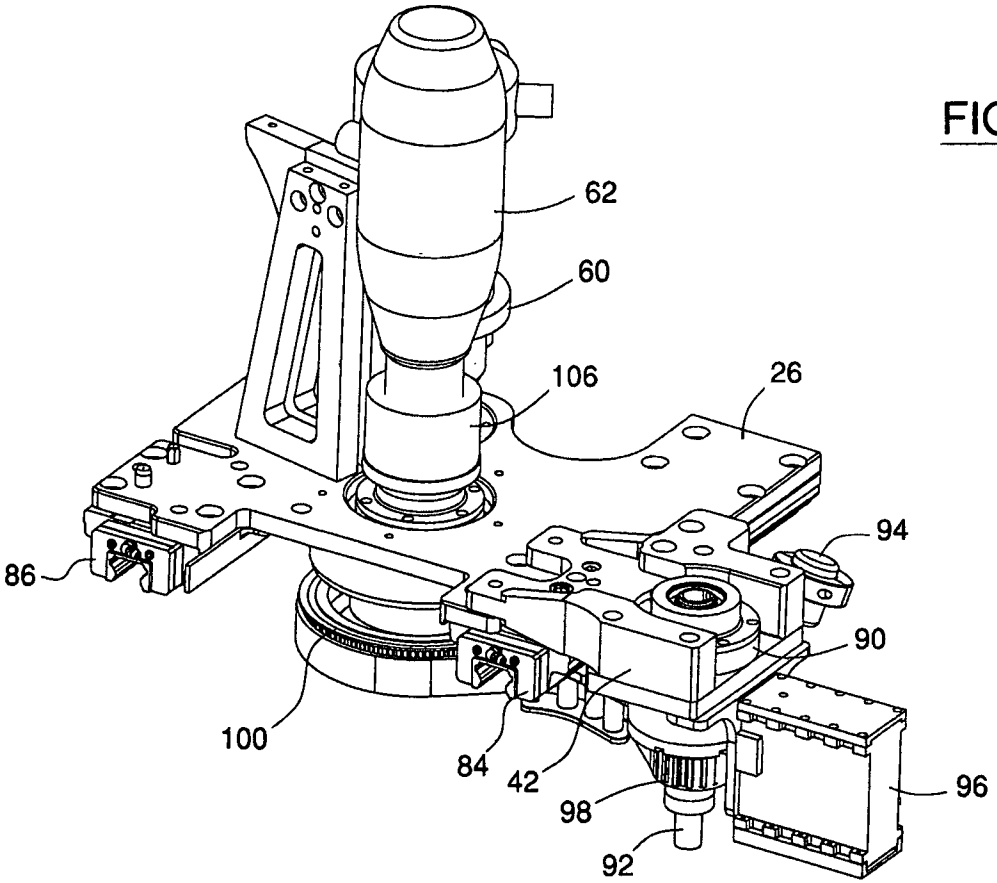
FIGS. 5A and 5B are schematic top and bottom view diagrams of the second frame member of the support assembly for the milling tool.
Figure 5B:
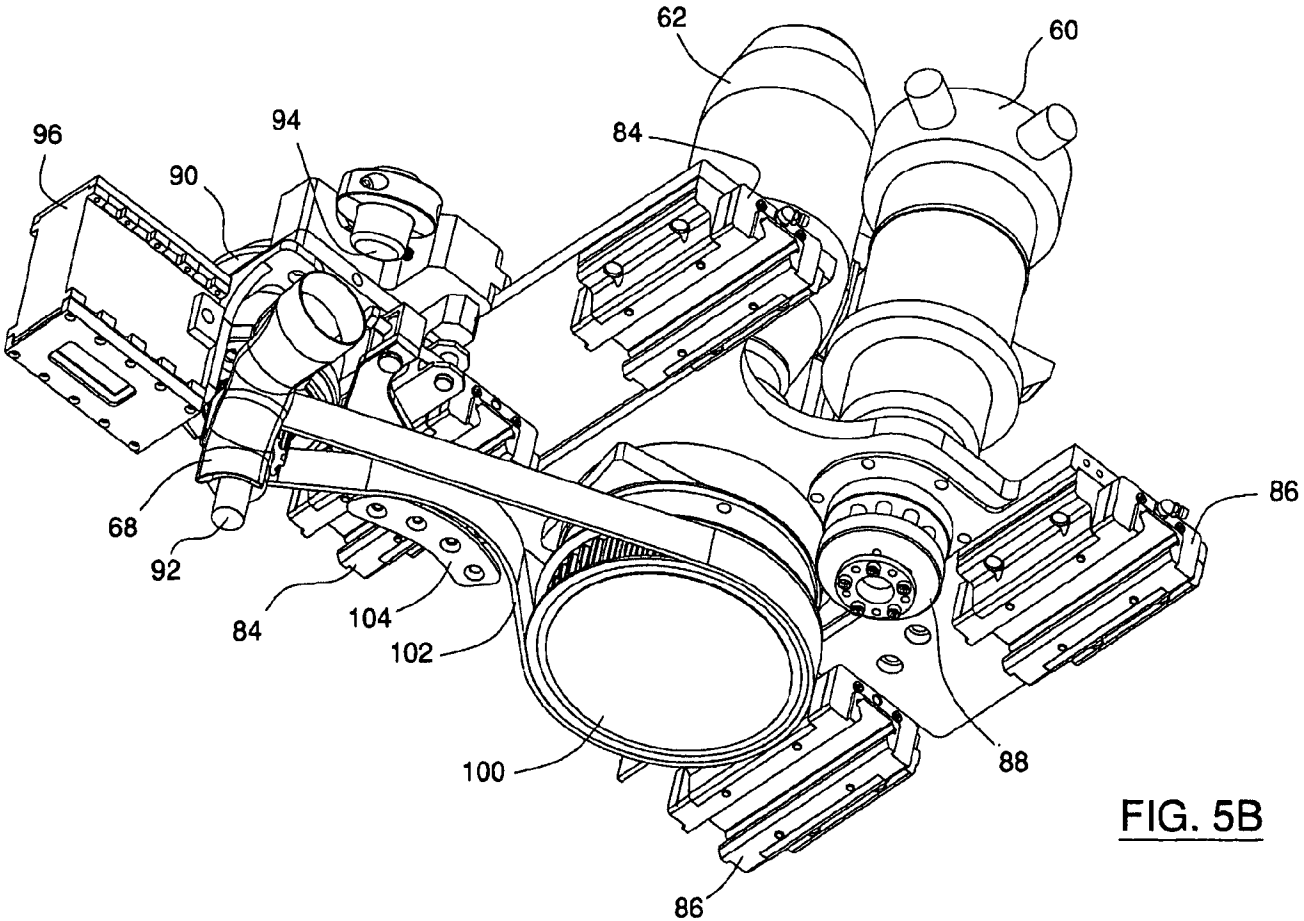

Referring to FIGS. 5A and 5B, the member 26 has two pairs of guiding shoes 82, 84 (better shown in FIG. 5B) slideably mounted on the tracks 78 (shown in FIG. 4). The rack and pinion system used to move the mobile member 26 in the X axis may be formed of a precision pinion 88 coupled to the motor 60 and engaging with the rack 80 (shown in FIG. 4). The motor 60 may be a hybrid stepping motor with an integrated reducer.

Depending on the tool to be used by the robot 2, the tool holder 42 may be provided with a tool bearing mechanism 90 to which the tool 92 can be secured in a possibly rotatable manner. The tool holder 42 may also be used to support an optional camera 94, the suction nozzle 68 coupled to the flexible pipe 70 (shown in FIG. 3), and a sensor 96. The camera 94 may be used to view the working area of the tool 92. The sensor 96 may be positioned close to the tool 92 and arranged to perform a relative distance measurement between a reference point of the robot 2 and a corresponding point on the surface to be machined. The sensor 96 may be a laser sensor so as to obtain a good resolution and measurement precision, without contact with the surface to be machined underwater. However, other types of sensors may be used if desired provided that the precisions required for performing the machining task are satisfied.

The tool 92 may be driven in rotation by a sprocket wheel 98 driven by another sprocket wheel 100 through a sprocket belt 102 (better shown in FIG. 5B) whose tension is controlled by a tightener 104. The tool bearing mechanism 90 then rotatably supports the tool 92 and transmits rotation of the sprocket wheel 98 to the tool 92. The wheel 100 may be coupled to the motor 62 through a magnetic coupling clutch mechanism 106 for transmitting rotation of the motor 62 to the sprocket wheel 100. Other types of coupling mechanisms may be used if desired, and a direct drive configuration may also be used to drive the tool 92 to simplify the driving arrangement if desired, for example depending on the size and power of the motor 62.

Figure 6:
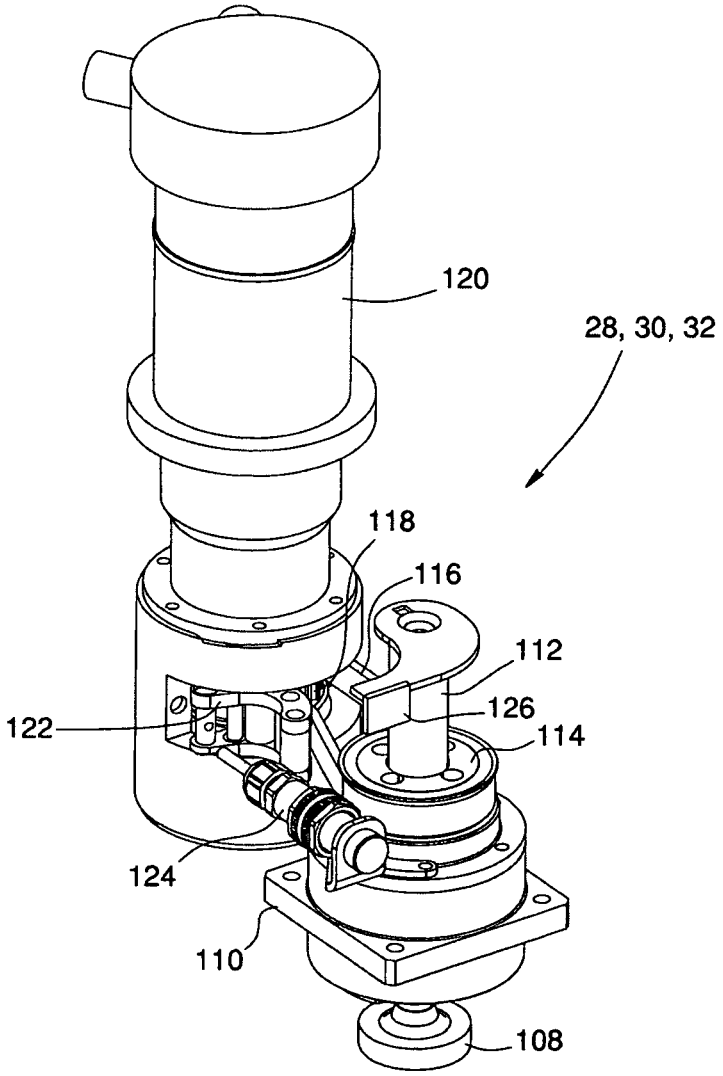
FIG. 6 is a schematic diagram of a support and guiding structure for a levelling foot according to the invention.

Referring to FIG. 6, there is shown a possible construction for the levelling legs 28, 30, 32. A levelling foot 108 slideably projects under a housing 110. The foot 108 is connected to a linear actuator made of an ACME screw assembly having a shaft 112 with a longitudinal keyway coupled to a rotatable nut 114. The nut 114 forms a toothed pulley coupled to a driving toothed pulley 118 through a belt 116 provided with a tightener 122. The driving pulley 118 is driven by a motor 120, e.g. a hybrid stepping motor with integrated reducer. Lowering and raising of the foot 108 is achieved by operating the motor 120 in one direction or the other so that rotation of the driving pulley 118 is transmitted to the pulley-like nut 114 by the belt 116, and rotation of the nut 114 is converted into a linear motion of the shaft 112 to which the foot 108 is connected. A proximity sensor 124 e.g. of an inductive type may be mounted on the housing 110 to detect a metal hook 126 projecting at an upper end of the shaft 112 in order to limit a farthest course of the foot 108 under the housing 110.

Referring back to FIG. 3, the foregoing construction of the robot 2 allows it to be used in a water depth of at least 30 meters. The mechanical structure of the members 24, 26 and their associated components ensures a rigidity supporting the milling efforts for restoring steel or other structures. The number of degrees of freedom and mobile parts is minimal in order to perform the required movements for a machining task, and the rigidity of each part of the support assembly 22 is adapted to the efforts to which it is subjected to. The positioning capacities of the robot 2, through the precise measuring devices and the appropriate rigidity, combined with a control strategy with trajectory verification, allows achieving a milling or other similar machining task in an automated manner and with precision.

The five degrees of freedom of the robot 2 allows, with respect to the tool 92 (shown in FIG. 4), a X axis translation resulting from the displacement of the mobile member 26, a Y axis translation resulting from the displacement of the mobile member 24, and a Z axis translation (perpendicular to the X-Y plane) resulting from the combined displacement of the three levelling legs 28, 30, 32 and two rotations (one around the X axis, another one around the Y axis) resulting from the displacement of one or two levelling legs 28, 30, 32 while the third one remains fixed.

For a precise positioning of the robot 2 for example for restoring an embedded part on its whole length, an overlap based positioning method may be used. Such a method allows global referencing of the robot 2 with respect to a reference point such as a point located in an upper portion of the slot 4 (shown in FIG. 1) out of the water. The method uses a starting reference point and local references between every displacements of the robot 2 in order to find a relative position with respect to a previous position to determine a current position of the robot 2 by computations.

Referring to FIG. 1, the positioning method may proceed as follows.

1. From the surface, using the cable 12, the robot 2 is vertically positioned in the slot 4 in front of the first section to be machined, engageable through the slot opening. A lower portion of the robot 2 may be submerged while an upper portion of the robot 2 remains out of the water.

2. Pneumatic pressure is turned on to actuate the pistons 34, 36 in order to lock the robot 2 in the slot 4.

3. Two mirror references located on the upper portion of the robot 2 are referenced outside the water using a precision laser tracker (not shown). For more precision, both references may be as far as possible from each other in the X and Y axes. With the displacements of each levelling legs 28, 30, 32 (shown in FIG. 3), the orientation (rotation) of the X and Y axes of the robot 2 is adjusted until the X-Y plane required for the restoration is reached. The robot 2 is then initialized at its zero machine point.

4. The machining operation is performed on the current machining area using X, Y and Z translation movements as provided by the robot 2. A trajectory algorithm may be used to compensate small deviations in rotation in the Z axis that may occur (Arz). Optionally, the sensor 96 (shown in FIG. 4) may carry out a complete or partial scan of the surface before and/or after the machining operation.

5. The pneumatic pressure is turned off to release the pistons 34, 36 to allow vertical movements of the robot 2 in the slot 4.

6. The robot 2 is lowered in the slot 4 about 90% of its effective machining vertical range (for a 1 m range, the robot 2 would be lowered about 900 mm). In other words, the robot 2 is lowered so as to reach the next section to be machined while preserving about 10% of the section previously machined (e.g. initially in the upper portion of the slot 4). If the bottom of the slot 4 is reached, this will be the last machined section.

7. The pneumatic pressure is turned on to actuate the pistons 34, 36 to lock the robot 2 in the slot 4 for the new machining task.

8. The 10% overlapping surface restored during the last machining operation is measured with the sensor 96 (for a robot with a 1 m range, the overlapping surface has a 100 mm height). Using vision algorithms, the shifts Δtx, Δty, Δtz, Δrx, Δry, Δrz resulting from the last displacement of the robot 2 may be correctly obtained as a function of the precision of the measurements carried out. Optionally, other sensors like inclinometers (not shown) on the robot 2 may be coupled to the algorithms to reduce possible detection errors.

9. The orientation (rotation) of the X and Y axes of the robot 2 is adjusted until the X-Y plane required for the restoration is reached. This plane corresponds to the continuity of the plane obtained during the last machining operation.

10. Return to step 4.

Other positioning methods may be used when the machining is not to be achieved on all the length of the underwater structure in a constant manner. The basic principle remains the same but the steps, the algorithms and the computations to be carried out may be different.

Referring to FIG. 7, there is shown a schematic simplified control diagram of the robot 2. The onboard control unit 128 in the watertight enclosure 52 controls motor drives 130 connected to the motors 60, 58, 28, 30, 32 and 62. The onboard control unit 128 communicates with the measurement sensor unit 96 to receive the distance data computed by the sensor. The onboard control unit 128 also receives proximity alert signals from the proximity sensors 76, 77 and 124, in order to detect the end of each axis. For the Z axis, only the lower end as been chosen to be detected. The control station 18 has a user interface monitor 132, a user interface computer 134, an electronics power supply unit 136 and a motors power supply unit 138. The umbilical cable 16 connects the control station 18 with the watertight enclosure 52. The electronics power supply unit 136 provides the supply to the onboard control unit 128, the proximity sensors 76, 77, 124, the measurement sensor unit 96 and possibly the cameras 53, 94 through the umbilical cable 16. The video signals from the cameras 53, 94 can be transmitted through the umbilical cable 16 to the user interface computer 134 or to a separate monitoring unit (not shown) if desired. The motors power supply unit 138 provides the supply to the motor drives 130 through the umbilical cable 16. The user interface computer 134 has a bidirectional communication link with the onboard control unit 128 also through the cable 16. A video signal from the user interface computer 134 is sent to the user interface monitor 132.

While embodiments of the invention have been illustrated in the accompanying drawings and described above, it will be evident to those skilled in the art that modifications may be made therein without departing from the invention. For example, the support assembly 22, the mobile members 24, 26, the tool bearing mechanism 90, the magnetic coupling mechanism 106 and the housing 110 may be constructed differently, as long as their constructions are submersible, have rigidities resisting to the direct and indirect efforts produced by the tool 92, and fulfill functions similar to those described above. The motors 120 of the legs 28, 30, 32, the motors 58, 60 for moving the mobile members 24, 26, and the thrust pistons 34, 36 contribute to the precision of the displacements of the tool 92 and provide an appropriate displacement and positioning range for the tool 92 with respect to the target surface for a machining task or another similar task. The motors 120, 58, 60 may be of different types and constructions if desired, as long as they allow the required positioning of the mobile elements 24, 26, 28, 30, 32. The motors 120, 58, 60 can be optionally provided with braking mechanisms (not shown) for increased safety. Additional stops and sensors (not shown) may be provided for redundancy and increased safety. The proximity sensors 76, 124 may be positioned otherwise and be of other types if desired.

It is possible to use the robot 2 in other configurations, for example for vertical or horizontal displacement on a structure of any kind without using the structure for referencing purposes, but only for replacing the cable 12 providing from the hoisting system at the surface. The locking arrangement of the robot 2 in the slot 4 with respect to the target surface may have another design depending on the configuration of the underwater structure. For example, the locking arrangement may be designed to squeeze a beam or a like member (not shown) extending near the target surface of the underwater structure.

The robot 2 may also be used to perform measurement, restoration or reconditioning works of an immerged structure in a dam, a ship harbor, a borehole, a bridge structure, or a ship hull.

The invention claimed is:

1. A submersible robot for operating a tool relative to a surface of an underwater structure, comprising:

a support assembly;

a tool holder for holding the tool in operative position relative to the surface of the underwater structure, the tool holder being movably mounted on the support assembly so that the tool is movable in a work area relative to the surface of the underwater structure when the tool is mounted on the tool holder;

a driving arrangement mounted on the support assembly for moving the tool holder so that the tool is movable within the work area when the tool is mounted on the tool holder;

a locking arrangement mounted on the support assembly for locking a position of the support assembly relative to the surface of the underwater structure;

a levelling arrangement mounted on the support assembly for adjusting an orientation of the support assembly relative to the surface of the underwater structure when the support assembly is locked by the locking arrangement;

a sensor unit directable toward the surface of the underwater structure, for measuring a distance between the robot and the surface of the underwater structure; and a programmable control unit mounted on the support assembly for operating the driving arrangement, the locking arrangement, the levelling arrangement and the tool and receiving measurements from the sensor unit, the programmable control unit having an operation mode wherein a positioning of the robot relative to the surface of the underwater structure is determined and controlled as function of an initial position of the robot for defining a first work area, and shifted positions of the robot for defining additional work areas, the work areas having overlapping portions with one another for tracking displacements of the robot relative to the surface of the underwater structure using the sensor unit.

2. The submersible robot according to claim 1, wherein the support assembly has opposite ends, at least one of which is provided with a fastener projecting from the support assembly for attachment to a hoisting element.

3. The submersible robot according to claim 1, wherein the support assembly comprises an elongated frame, a first mobile member movably mounted on the frame in a longitudinal direction of the frame, and a second mobile member movably mounted on the first mobile member in a transverse direction of the frame, the tool holder being mounted on the second mobile member.

4. The submersible robot according to claim 3, wherein the driving arrangement comprises motors and respective rack and pinion assemblies operably coupled to corresponding ones of the first and second mobile members for moving the first mobile member in the longitudinal direction and the second mobile member in the transverse direction.

5. The submersible robot according to claim 3, wherein the support assembly is provided with a camera directed to view a displacement of the mobile members.

6. The submersible robot according to claim 3, wherein the support assembly has flexible cable guides extending between the programmable control unit and the mobile members.

7. The submersible robot according to claim 3, wherein the elongated frame has an opening for passage of the tool holder.

8. The submersible robot according to claim 1, wherein the locking arrangement and the levelling arrangement comprise together common complementary sets of adjustable leg members projecting on opposite sides of the support assembly and operable so that the adjustable leg members jut outwardly from the support assembly for pressing against opposite surfaces of the underwater structure to lock the support assembly and adjust a level of the support assembly relative to the surface of the underwater structure, whereby the tool holder has five degrees of freedom in the work area.

9. The submersible robot according to claim 8, wherein the set of adjustable leg members on the side of the support assembly opposite to the work area comprises pneumatically actuated pistons mounted on the support assembly, and the set of adjustable leg members on the side of the support assembly facing the work area comprises electrically actuated leg assemblies each having a foot slideably projecting from a housing mounted on the support assembly.

10. The submersible robot according to claim 9, wherein each electrically actuated leg assembly further has a motor coupled to a linear actuator connected to the foot.

11. The submersible robot according to claim 1, wherein the programmable control unit comprises a watertight enclosure mounted on the support assembly, and an onboard control unit housed in the watertight enclosure, the watertight enclosure being connectable to an umbilical cable through which at least one of power conductors, communication conductors and a gas supply pipe passes.

12. The submersible robot according to claim 1, wherein the tool holder comprises a motor connectable to the tool for driving the tool in operation.

13. The submersible robot according to claim 12, wherein the tool holder has a magnetic coupling arrangement for connecting the motor to the tool.

14. The submersible robot according to claim 12, wherein the tool holder comprises a bearing mechanism for rotatably receiving the tool.

15. The submersible robot according to claim 12, wherein the support assembly is provided with a pump and the tool holder has a suction nozzle extending near the tool and coupled to the pump.

16. The submersible robot according to claim 1, wherein the sensor unit is mounted on the tool holder, the distance being measured between a predetermined reference point of the robot and a corresponding point on the surface to be machined.

17. The submersible robot according to claim 16, wherein the sensor unit comprises a laser sensor.

18. The submersible robot according to claim 1, wherein the underwater structure comprises one of a runway, a seal seat, a sill and a lintel of a sluice.

19. The submersible robot according to claim 1, wherein the displacements tracked using the sensor unit comprise Cartesian and angular displacements of the robot.

* * * * *